United States Patent [19]

Huang

[11] Patent Number: 5,165,060

[45] Date of Patent: Nov. 17, 1992

[54] ADJUSTABLE SPRING LOADED EYEGLASS BOW

[75] Inventor: David Huang, Taipei Hsien, Taiwan

[73] Assignee: Huang Poo Corporation, Taipei Hsien, Taiwan

[21] Appl. No.: 771,607

[22] Filed: Oct. 4, 1991

[51] Int. Cl.⁵ .............................................. G02C 5/14
[52] U.S. Cl. ................................................... 351/113
[58] Field of Search ....................... 351/113, 121, 153; 16/228; 2/450

[56] References Cited

U.S. PATENT DOCUMENTS 4,005,930 2/1977 Guenin ................................ 351/113

FOREIGN PATENT DOCUMENTS 306446 3/1989 European Pat. Off. ............ 351/153

Primary Examiner—Rodney B. Bovernick
Attorney, Agent, or Firm—Darby & Darby

[57] ABSTRACT

An adjustable eyeglass bow includes an elongated metal bow and a molded plastic connector seat having a rear end provided with a socket to securely receive one end of the elongated metal bow and a front end provided with a longitudinal blind bore. A washer divides the blind bore into an outer receiving chamber and an inner receiving chamber. A bolt piece is disposed in the blind bore and has a head portion extending into the inner receiving chamber and a threaded end portion passing through the washer and into the outer receiving chamber. A hinge piece includes a shaft portion slidably extending into the outer receiving chamber and having a rear end provided with an axial screw socket to engage the threaded end portion of the bolt piece. The hinge piece further includes a rounded pivot projection formed on a front end of the shaft portion and extending out of the outer receiving chamber to permit the mounting of the adjustable eyeglass bow onto a lens frame. A compression spring is disposed inside the inner receiving space and biases the bolt piece in order to pull the hinge piece inwardly into the outer receiving chamber. No welding operation is employed to assemble the adjustable eyeglass bow, thereby obviating the presence of scars.

1 Claim, 3 Drawing Sheets

ADJUSTABLE SPRING LOADED EYEGLASS BOW

BACKGROUND OF THE INVENTION

1. Field of the Invention

The invention relates to an adjustable eyeglass bow, and more particularly to an adjustable eyeglass bow which does not require a welding operation to assemble the same.

2. Description of the Related Art

FIGS. 1 and 2 show a conventional adjustable eyeglass bow to comprise an elongated metal bow 1, a hollow connector seat 11 welded onto one side of the metal bow 1, and a spring-loaded connector means 12 provided in the connector seat 11. A pin 120 prevents the release of the connector means 12 from the connector seat 11. The front end of the connector means 12 is provided with a rounded pivot projection 121 to permit mounting of the adjustable eyeglass bow onto a lens frame (not shown). When the pivot projection 121 is pulled away from the connector seat 11, a notch 110 is formed on the tail end of the connector seat 11. The connector means 12 can prevent the untimely folding of the adjustable eyeglass bow. At the same time, the connector means 12 permits adjustments in the length of the adjustable eyeglass bow so that an eyeglass incorporating the same may be comfortably and fittingly worn by the consumer.

The drawbacks of the above-disclosed adjustable eyeglass bow are as follows:

1. The connector seat 11 is made of metal and thus, a welding operation must be conducted so as to mount the connector seat 11 onto the elongated metal bow 1.

2. Scars are formed on the elongated metal bow 1 and on the connector seat 11 during the welding operation.

3. The material and manufacturing costs of the conventional adjustable eyeglass bow are relatively high. The connector seat 11 is made of metal and requires further machining so as to ensure that the connector means 12 will be properly received therein.

SUMMARY OF THE INVENTION

Therefore, the objective of the present invention is to provide an adjustable eyeglass bow which does not require a welding operation to assemble the same, thereby overcoming the drawbacks associated with the conventional adjustable eyeglass bow.

Accordingly, the preferred embodiment of an adjustable eyeglass bow of the present invention comprises: an elongated metal bow; a molded plastic connector seat having a rear end provided with a socket to securely receive one end of the elongated metal bow, a front end provided with a longitudinal blind bore, and a partition means dividing the blind bore into an outer receiving chamber and an inner receiving chamber; a bolt piece disposed in the blind bore and having a head portion extending into the inner receiving chamber and a threaded end portion passing through the partition means and into the outer receiving chamber; a hinge piece including a shaft portion slidably extending into the outer receiving chamber and having a rear end provided with an axial screw socket to engage the threaded end portion of the bolt piece, and a rounded pivot projection formed on a front end of the shaft portion and extending out of the outer receiving chamber to permit mounting of the adjustable eyeglass bow onto a lens frame; and a compression spring means disposed inside the inner receiving space and biasing the bolt piece so as to pull the hinge piece inwardly into the outer receiving chamber. No welding operation is employed to assemble the adjustable eyeglass bow, thereby obviating the presence of scars.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
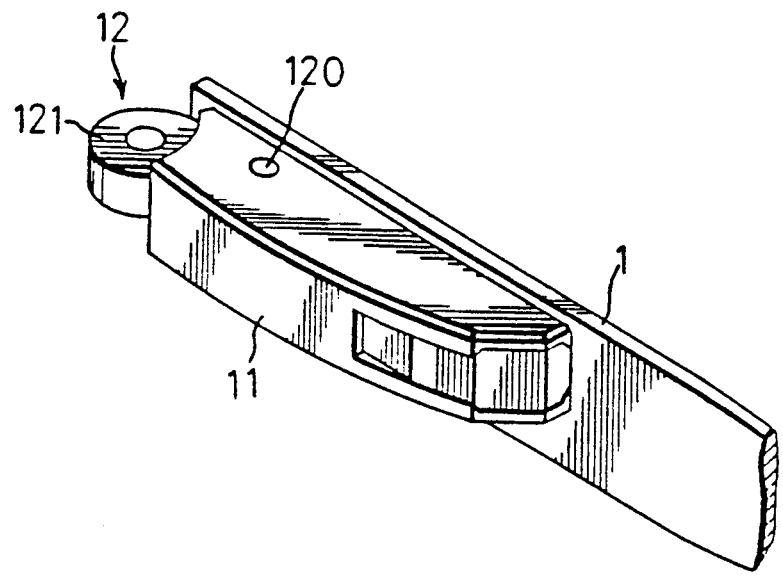
FIG. 1 is an illustration of a conventional adjustable eyeglass bow when in a static condition.
Figure 2:
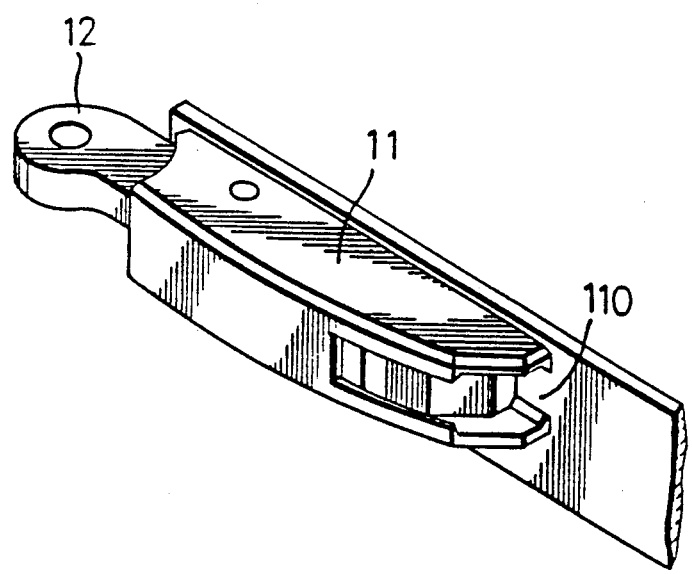
FIG. 2 is an illustration of the adjustable eyeglass bow when in use.
Figure 3:
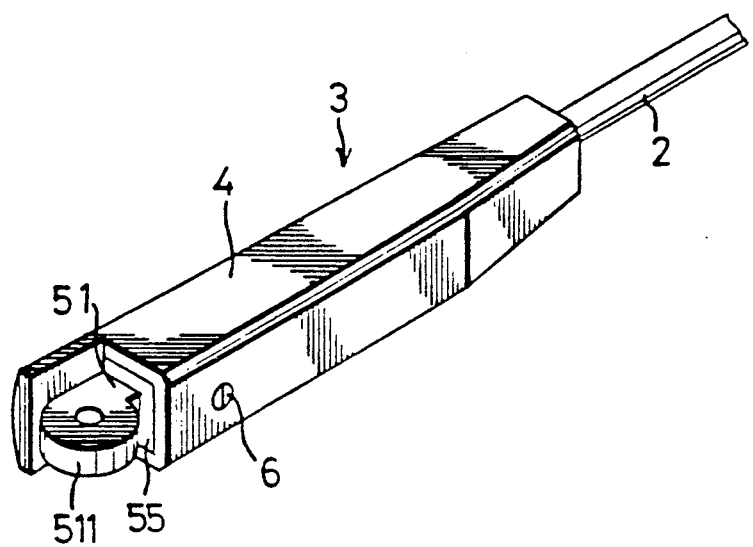
FIG. 3 is a perspective view of the preferred embodiment of an adjustable eyeglass bow according to the present invention.
Figure 4:
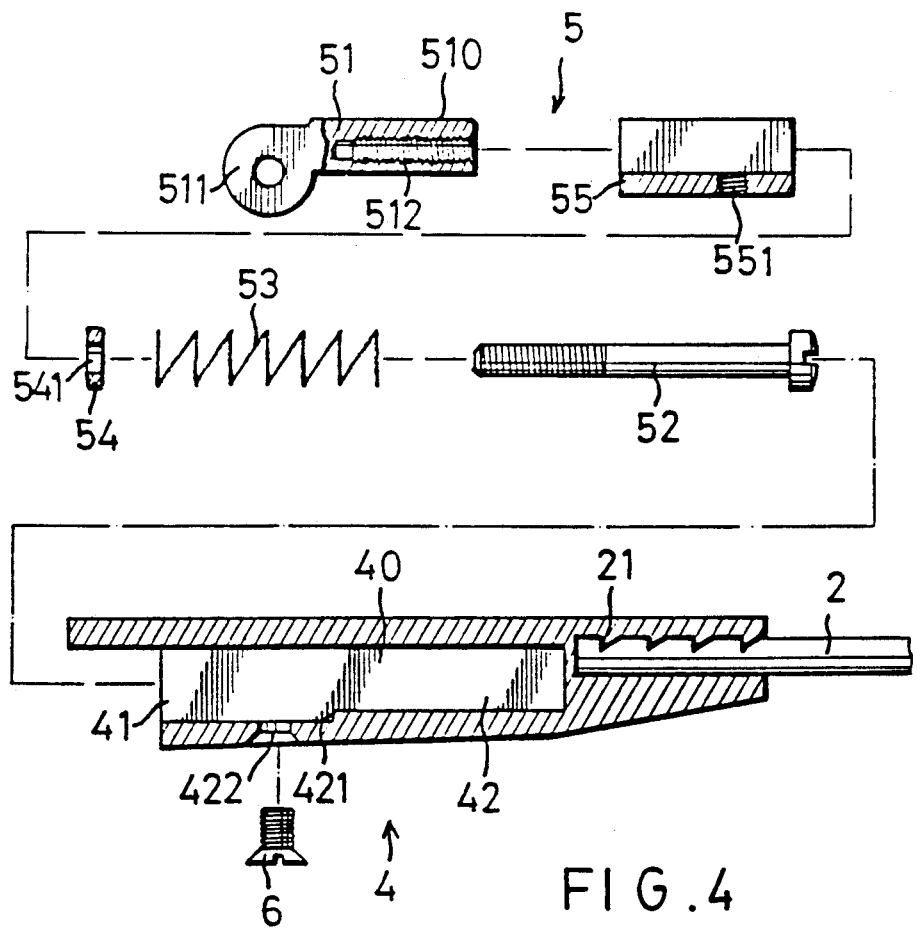
FIG. 4 is an exploded, partly sectional view of the preferred embodiment.

Referring to FIGS. 3 and 4, the preferred embodiment of an adjustable eyeglass bow 3 according to the present invention is shown to comprise an elongated metal bow 2, a connector seat 4 and a spring-loaded connector means 5.

The elongated metal bow 2 has a front end portion provided with a plurality of engaging grooves 21. The connector seat 4 is an integral plastic member which is formed during a conventional molding process (such as injection molding). The rear end of the connector seat 4 is provided with a socket to securely receive the front end portion of the elongated bow 2. No welding process is employed to join the connector seat 4 and the elongated bow 2, thereby obviating the presence of scars.

The front end of the connector seat 4 is provided with a longitudinal blind bore 40. The blind bore 40 is divided into an outer receiving chamber 41 and an inner receiving chamber 42 in communication with the outer receiving chamber 41. The size of the outer receiving chamber 41 is bigger than that of the inner receiving chamber 42. Since one side of the outer receiving chamber 41 is aligned with that of the inner receiving chamber 42, an inward step portion 421 is thus formed on the other side of the outer and inner receiving chambers, 41 and 42.

Figure 5:
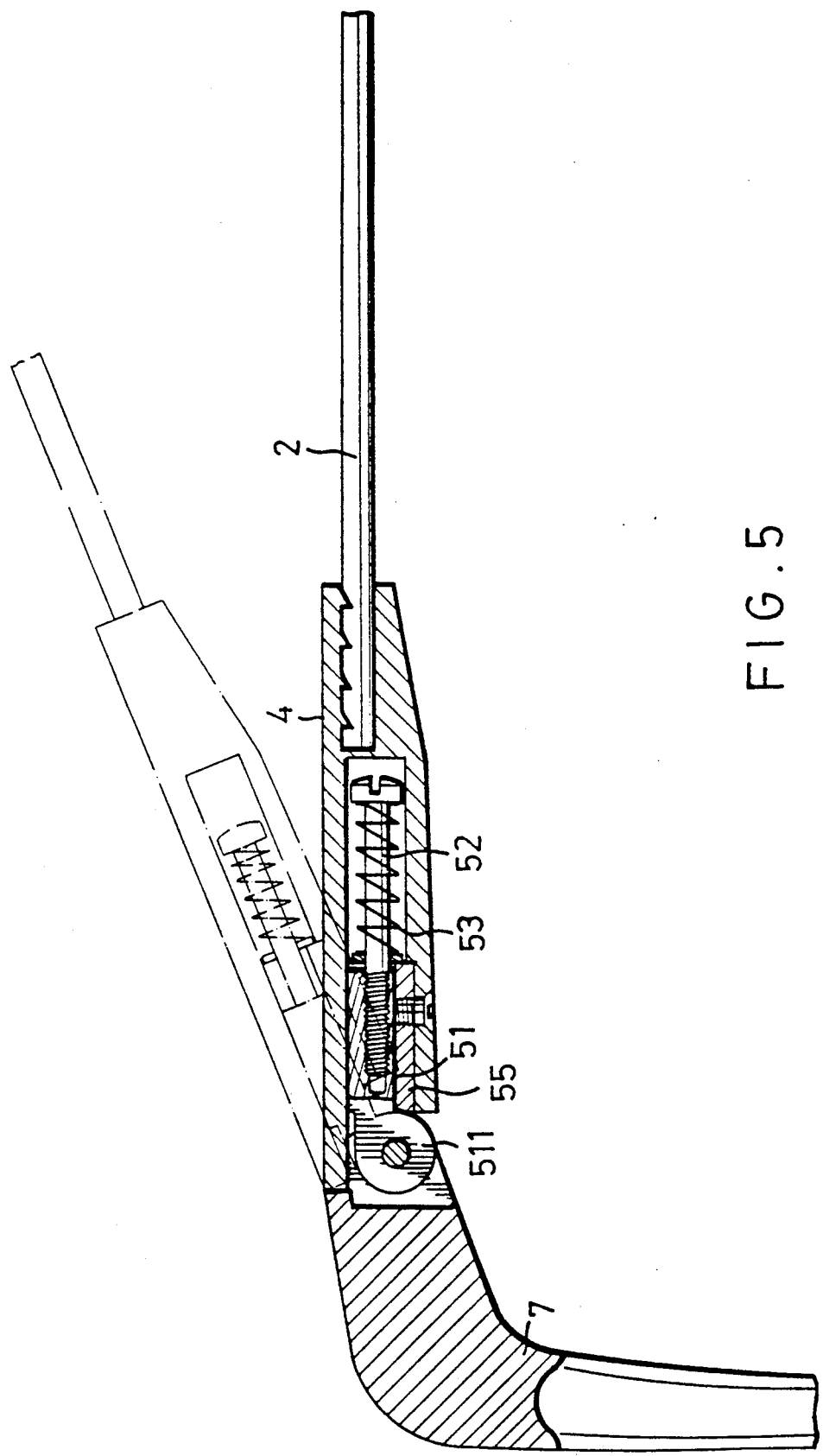
FIG. 5 is a sectional view of the preferred embodiment when used in combination with a lens frame.

Referring to FIGS. 4 and 5, the spring-loaded connector means 5 includes a hinge piece 51, a bolt piece 52, a compression spring 53, a washer 54 and a bushing 55.

The hinge piece 51 has a shaft portion 510 extending into the outer receiving chamber 41 and having an axial screw socket 512 at the rear end thereof. The front end of the shaft portion 510 is formed with a rounded pivot projection 511 to permit the mounting of the preferred embodiment onto a lens frame 7. The bolt piece 52 has a head portion extending into the inner receiving chamber 42 and a threaded portion extending into the outer receiving chamber 41 and engaging the hinge piece 51 at the screw socket 512 of the latter. The compression spring 53 is provided around the bolt piece 52. The washer 54 has an opening 541 for the bolt piece 52 and is disposed inside the blind bore 40 so as to partition the outer and inner receiving chambers, 41 and 42. The compression spring 53 is confined in the inner receiving chamber 42 and is disposed between the head portion of the bolt piece 52 and the washer 54. The bushing 55 is U-shaped in cross-section and is received inside the outer receiving chamber 41. The bushing 55 has a rear end which abuts against the step portion 421. The connector seat 4 is provided with a counterbore 422 to access the outer receiving chamber 41. The bushing 55 has one side provided with a threaded opening 551 to be aligned with the counterbore 422. A screw 6 extends into the counterbore 422 and engages the bushing 55 at the threaded opening 551 so as to secure the bushing 55 to the connector seat 4. The shaft portion 510 of the hinge seat 51 extends into the outer receiving chamber 41 and is in sliding contact with the bushing 55 and with one side of the connector seat 4.

To assemble the preferred embodiment, the compression spring 53 and the washer 54 are first provided on the bolt piece 52. The bolt piece 52 then threadedly engages the hinge piece 51. The head portion of the bolt piece 52, the spring 53 and the washer 54 are provided in the inner receiving chamber 42, while the shaft portion 510 of the hinge piece 51 is provided in the outer receiving chamber 41. The pivot projection 511 extends out of the outer receiving chamber 41 and can be mounted onto the lens frame 7. The bushing 55 is then provided in the outer receiving chamber 41 so that the shaft portion 510 is in sliding contact with the bushing 55 and with one side of the connector seat 4. The bushing 55 has a rear end which abuts against the step portion 421 and the washer 54, and one side which is threadedly secured to the connector seat 4.

When the preferred embodiment is rotated outwardly of the lens frame 7, the hinge piece 51 pulls the head portion of the bolt piece 52 to thereby compress the spring 53 and permit sliding movement of the shaft portion 510 along the bushing 55. When the force applied on the preferred embodiment is released, the compression spring 53 expands and urges the bolt piece 52 to pull the hinge piece 51 inwardly of the outer receiving chamber 41 so as to restore the preferred embodiment to a static position relative to the lens frame 7. This illustrates how the preferred embodiment cooperates with a lens frame 7 to form an eyeglass which can be comfortably and fittingly worn by the consumer.

The advantages of using the adjustable eyeglass bow of the present invention are as follows:

1. No welding operation is required to assemble the preferred embodiment. No scars are thus formed on the connector seat.

2. The material and manufacturing costs are lower. The connector seat is a molded plastic member which does not require additional machining operations.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. An adjustable eyeglass bow, comprising:
   an elongated metal bow;
   a molded plastic connector seat having a rear end provided with a socket to securely receive one end of said elongated metal bow, a front end provided with a longitudinal blind bore, and a partition means dividing said blind bore into an outer receiving chamber and an inner receiving chamber; and
   a spring-loaded connector means including a bolt piece disposed in said blind bore and having a head portion extending into said inner receiving chamber and a threaded end portion passing through said partition means and into said outer receiving chamber; a hinge piece including a shaft portion slidably extending into said outer receiving chamber and having a rear end provided with an axial screw socket to engage said threaded end portion of said bolt piece, and a rounded pivot projection formed on a front end of said shaft portion and extending out of said outer receiving chamber to permit mounting of said adjustable eyeglass bow onto a lens frame; and a compression spring means disposed inside said inner receiving space and biasing said bolt piece so as to pull said hinge piece inwardly into said outer receiving chamber.

* * * * *